Aug. 10, 1937.　　　　J. W. NORRIS　　　　2,089,407
AIR CONDITIONING FURNACE
Filed Jan. 6, 1936　　　2 Sheets-Sheet 1

Witness
H. S. Munzenmaier

Inventor
John W. Norris
by Bair, Freeman & Sinclair
Attorneys

Aug. 10, 1937.  J. W. NORRIS  2,089,407
AIR CONDITIONING FURNACE
Filed Jan. 6, 1936  2 Sheets—Sheet 2
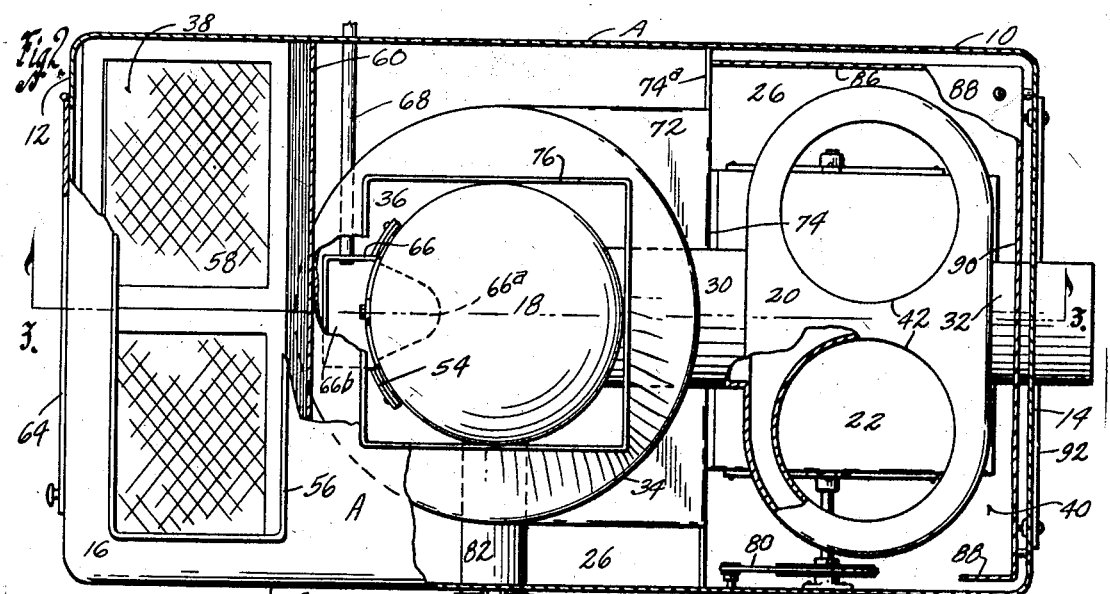
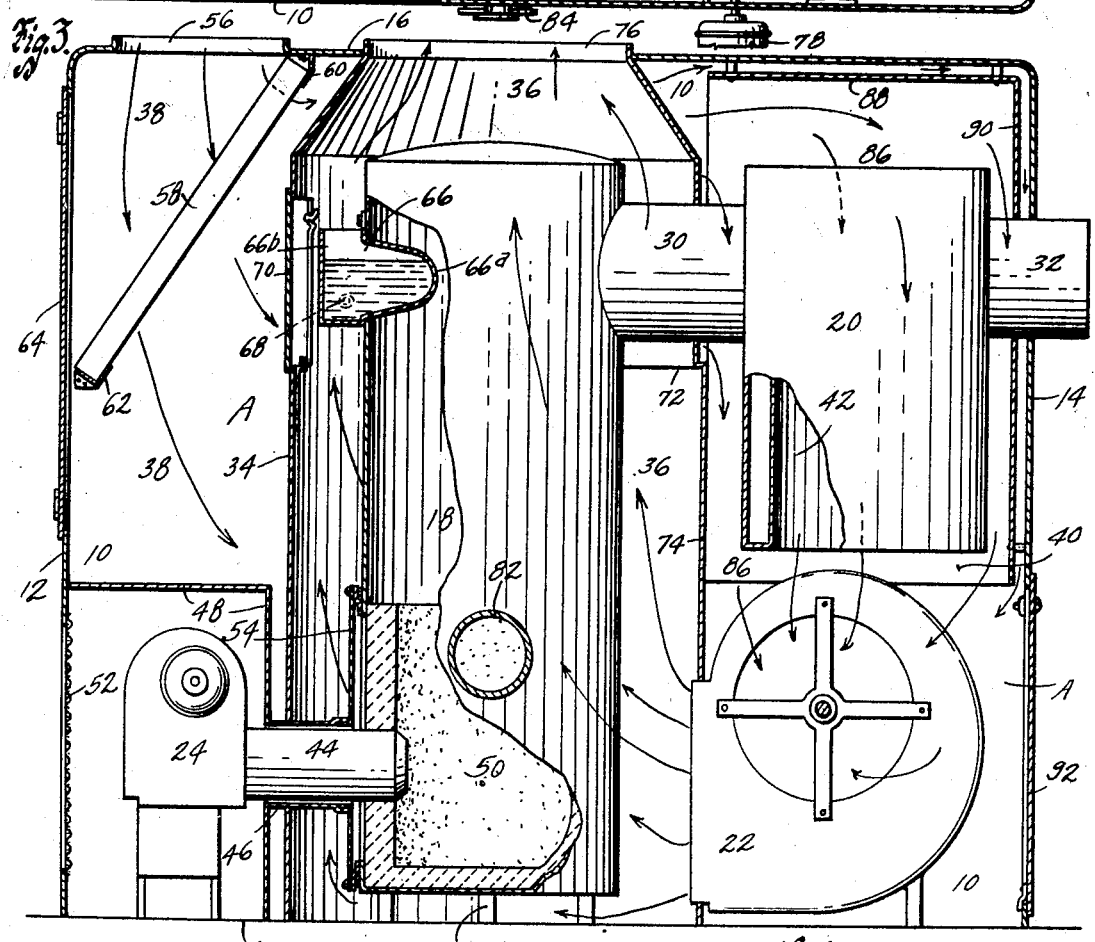
Inventor:—John W. Norris—
By Bair, Freeman & Sinclair
Attorneys
Witness
H. S. Munzenmaier Patented Aug. 10, 1937

2,089,407

UNITED STATES PATENT OFFICE 2,089,407

AIR CONDITIONING FURNACE

John W. Norris, Marshalltown, Iowa, assignor to Lennox Furnace Company, Marshalltown, Iowa, a corporation Application January 6, 1936, Serial No. 57,795.

2 Claims. (Cl. 126—110)

An object of my invention is to provide a compact design of air conditioning furnace which is simple, durable and inexpensive to construct.

A further object is to provide an improvement in furnaces of the oil or gas burning type, whereby a very efficient, yet compact, structure is made with ample provision for accessibility to all parts of the furnace, which might require attention after installation.

A further object is to provide a compact furnace arrangement in which provision is made for counter-current flow of air so that the incoming cool air serves as a means for insulating against the escape of heat from the hot air in the hot air chamber surrounding the combustion chamber, while at the same time the cool air picks up heat, thereby slightly preheating the cool incoming air before it reaches a secondary heat exchanger, wherein further heat is picked up to gain efficiency by the dissipation of this heat in the air being circulated and the removal of it from the hot gases issuing from the furnace.

Another object is to arrange the secondary heat exchanger adjacent the top and back of the casing, thus leaving space below the secondary heat exchanger for a blower which circulates the air.

Another object is to dispose air filters in my construction so that they will operate at greatest efficiency and so that fire hazards are eliminated.

Another object is to provide a burner compartment within the casing which isolates the burner from the heat of the combustion chamber, thus eliminating the usual heat radiated to the burner motor and its ignition transformer, etc.

Still another object is to provide a humidifier which will vaporize sufficient water to maintain the desired humidity.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 2 is a plan view of the same with parts broken away and other parts in section; and Figure 3 is a vertical sectional view on the line 3—3 of Figure 2, with the exception of part of the combustion chamber and the secondary heat exchanger.

Figure 1:
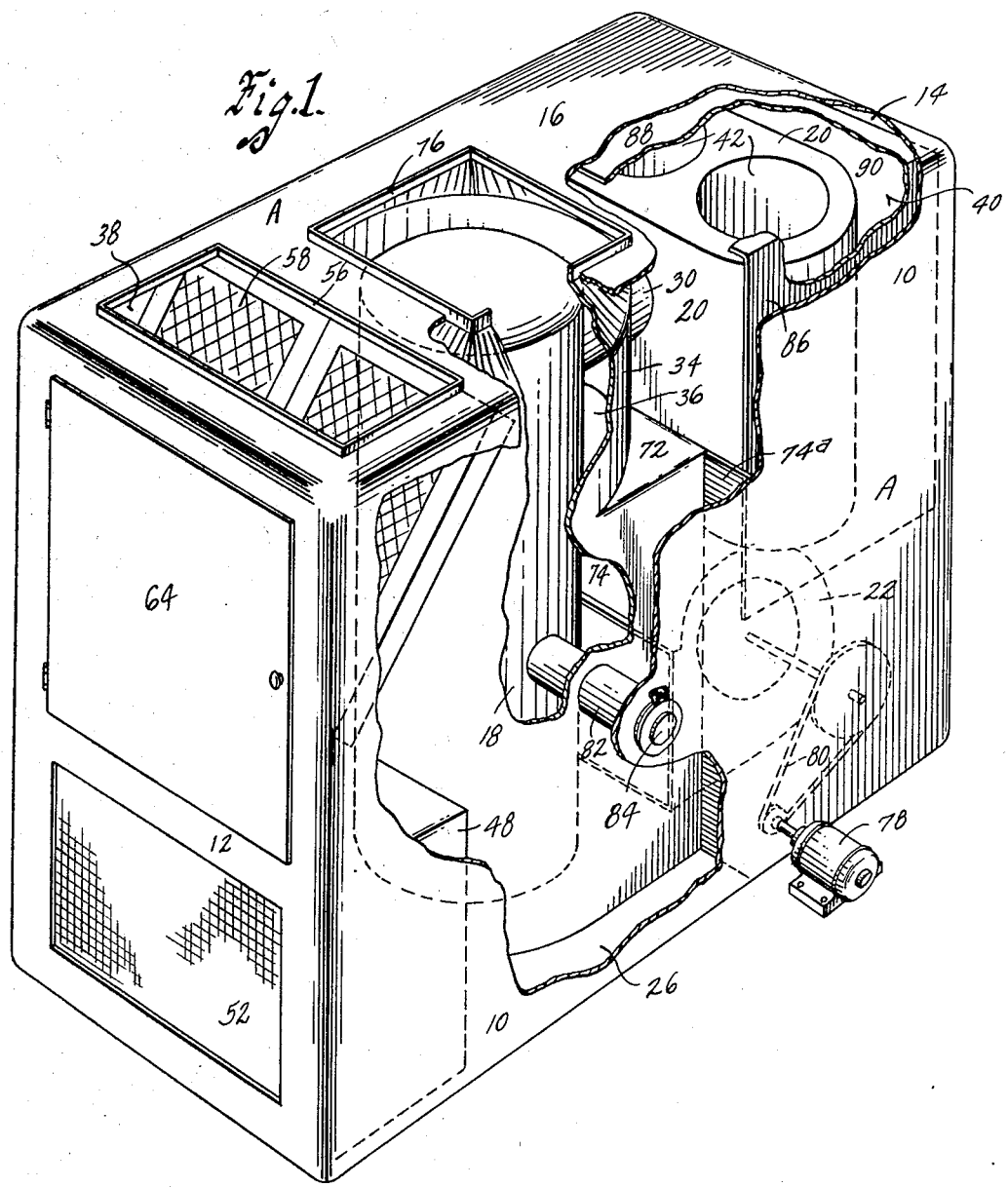
Figure 1 is a perspective view of an air conditioning furnace embodying my invention, parts thereof being broken away and other parts shown in section to illustrate the construction.

On the accompanying drawings I have used the reference character A to indicate generally a casing. The casing A has a pair of side walls 10, a front wall 12, a back wall 14 and a top wall 16. Within the casing A I provide a combustion chamber 18, a secondary heat exchanger 20, a blower 22, a burner 24, and other parts which will hereinafter be described.

The combustion chamber 18 is vertically arranged and comprises a cylinder having its top and bottom ends closed, the bottom end being spaced from a floor 26 as for instance by legs 28. The upper end of the combustion chamber 18 is connected by a pipe 30 with the secondary heat exchanger 20 from which a second pipe 32 extends to the chimney.

Surrounding the combustion chamber 18 is a casing wall 34 spaced from the combustion chamber, and thereby providing a hot air chamber at 36. The casing wall 34 is spaced from the outer casing A, thus providing a cool air chamber as at 38, while around the heat exchanger 20 a warm air chamber is provided as at 40. The secondary heat exchanger 20 is preferably provided with a pair of vertical openings 42 through which the air can flow as well as flowing around the outside of the exchanger.

The burner 24 has a nozzle 44 which extends through a tubular extension 46. The burner is housed by a housing 48 and the tubular extension 46 extends therefrom to a plate 54 forming part of the wall of the combustion chamber 18. The nozzle 44 extends through the tubular extension and into the combustion chamber, the lower part of which is lined with fire brick or the like 50, where the flame from the burner nozzle 44 issues into the combustion chamber.

The housing 48 isolates the burner compartment for the burner 24 from the circulating air under either negative or positive pressure within the casing A, yet provides for mounting the burner within the casing so that neatness of appearance is secured.

A grill front or the like 52 may be provided for the burner housing.

The casing A is provided with an intake opening 56 in the top thereof adjacent the front of the casing. Below this opening I mount an air filter 58 which is removable, the filter being mounted for instance on angle bars 60 and 62. The filter is arranged to slope forwardly and downwardly as shown in Figures 1 and 3, and access may be had to the filter for removing or replacing or cleaning it through a door 64 in the front of the casing.

I provide a humidifier for my air conditioning furnace comprising a water receptacle 66 having a portion 66a projecting into the combustion chamber 18, and a portion 66b exposed to the air circulating through the furnace, so that this air can pick up vapor from the humidifier. Water may be supplied through a pipe 68, a suitable automatic float valve (not shown) being preferably provided to maintain water at the desired level.

A removable door 70 is provided for the humidifier to afford access thereto for cleaning purposes or the like, this door being behind the filter 58 so that access can be had through it when the filter is removed.

The casing wall 34 at the back thereof and beneath the pipe 30 has a top wall 72 and a back wall 74. The wall 74 extends out to the sides of the casing A as indicated at 74a. This is for the purpose of causing air within the casing A surrounding the casing 34 to pass upwardly toward the top of the heat exchanger 20 before passing downwardly over the heat exchanger to the blower.

The hot air chamber 36 is provided with an outlet opening 76 which can either extend to a single register, or be provided with a plenum chamber from which pipes radiate to various registers.

For driving the blower 22 I provide an electric motor 78 connected as by a belt 80 to the blower. The motor is preferably mounted exterior to the casing A.

Extending from one side of the combustion chamber 18 I provide an inspection tube 82 terminating to the outer wall of the casing, and normally closed by a closure plate 84, which is hinged or otherwise mounted to provide for pressure release in case of a puff caused by a down draft or the like, or in case of an explosion from the burner.

*Practical operation*

In the operation of my furnace, when the blower is operating, cool air taken in at the intake 56 flows downwardly and rearwardly through the filter 58. This air is somewhat heated by contact with the casing wall 34, while at the same time it serves to prevent excessive transmission of heat from the hot air chamber 36 to the casing side walls 10, and then into the atmosphere surrounding the furnace.

The air then flows upwardly and rearwardly over the partitions 74a coming in contact with the secondary heat exchanger and flowing downwardly around it. This imparts further heat to the air, and such heat is extracted from the outcoming gases, so they are brought more nearly to atmospheric temperature and the available heat in the furnace is thus more efficiently utilized.

The air is then forced by the blower upwardly through the hot air chamber 36, absorbing most of the heat from the combustion chamber 18, and passing out through the outlet 76. Thus the incoming air is gradually preheated and finally heated to the maximum at the hottest part (the combustion chamber of the furnace).

To avoid loss of heat from the heat exchanger 20 through the casing walls 10, 14 and 16 I provide a cool air jacket comprising side walls 86, a top wall 88 and a back wall 90 slightly spaced from the walls of the casing A. Some of the cool air passes through this jacket space and this air circulates, thus inexpensively yet efficiently serving to insulate against excessive heat transmission to the surrounding atmosphere.

By my particular arrangement of parts in a furnace a compact design thereof is secured, yet efficient countercurrent flow of air is made possible. The coldest incoming air first strikes the point of last gas travel in the furnace, this being in the secondary heat exchange. The air then flows upwardly through the hot air chamber so that the hottest air leaves the hottest part of the furnace, which, of course, is the top of the combustion chamber, which flow of air maintains a greater difference in temperature between the heater and the air moving over it at all times, than is possible where the coldest air strikes the combustion chamber first, and then travels over the secondary heat exchanger.

My arrangement also sufficiently insulates the outer casing by the use of circulating cold air, thus eliminating the necessity for expensive insulating material such as asbestos or the like.

I have so arranged my furnace that the filter can be mounted at a place from which it is readily removable for cleaning purposes. It is also positioned so that it is not subjected to radiant heat from any of the parts of the furnace, since there is an air space between it and the casing wall 34, and then the hot air chamber between the casing wall and the combustion chamber. Thus there is no melting of the grease or oil used in the filter material, and no chance for lint to catch on fire from excessive radiant heat, as when the filter is mounted over the heat exchanger, for instance. Easy access is also had to the filter through the door 64 and to the humidifier also.

As far as the humidifier is concerned, it is of improved design, as it has the portion 66a projecting into the combustion chamber, where there is sufficient heat imparted to it for evaporating the required amount of water desired to maintain a satisfactory humid condition of the circulating air. This is especially necessary due to the rather low temperature experienced because of the volume of air circulated by the blower 22, whereas normal types of evaporating pans mounted in the hot air chamber only do not produce sufficient evaporation.

The grill 52 and the housing 48 are made removable and in the back of the casing A there is a panel 92 whereby access is had to the interior of the casing A for grouting the lower edges of the walls to the floor 26, to provide an air-tight connection of the casing A with the basement floor. Also the blower 22 is accessible through the panel 92 when necessary.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an air conditioning furnace, a furnace casing, a first casing therein defining a combustion chamber, a second casing surrounding said first casing and defining a hot air chamber between the two, said combustion chamber and second casing being arranged upright at the center of said furnace casing with space within the furnace casing in front of and behind said combustion and hot air chambers, means for admitting air through the top of said furnace casing at the front thereof, a filter below said means arranged on an incline downwardly and forwardly, a secondary heat exchanger within said furnace casing behind said combustion and hot air chambers and communicating with said combustion chamber to receive heated gases therefrom, a blower within said furnace casing below said secondary heat exchanger and walls within said furnace casing confining the entering air to travel around said hot air chamber then downwardly over said secondary heat exchanger and into said blower and then from the blower into the hot air chamber, said hot air chamber having an outlet at its top.

2. In an air conditioning furnace, a furnace casing, a first casing therein defining a combustion chamber, a second casing surrounding said first casing and defining a hot air chamber between the two, said combustion chamber and second casing being arranged upright at the center of said furnace casing with space within the furnace casing in front of and behind said combustion and hot air chambers, means for admitting air through the top of said furnace casing at the front thereof, a secondary heat exchanger within said furnace casing behind said combustion and hot air chambers and communicating with said combustion chamber to receive heated gases therefrom, a blower within said furnace casing below said secondary heat exchanger and walls within said furnace casing confining the entering air to travel around said hot air chamber then downwardly over said secondary heat exchanger and into said blower and then from the blower into the hot air chamber, said hot air chamber having an outlet at its top.

JOHN W. NORRIS.